Dec. 13, 1955  R. K. CUMMINS ET AL  2,726,487
METHOD FOR MAKING FUSED VITREOUS QUARTZ

Filed Nov. 21, 1952  2 Sheets-Sheet 1

Inventors:
Robert K. Cummins,
Robert J. Sommer,
by Vernet C. Kauffman
Their Attorney

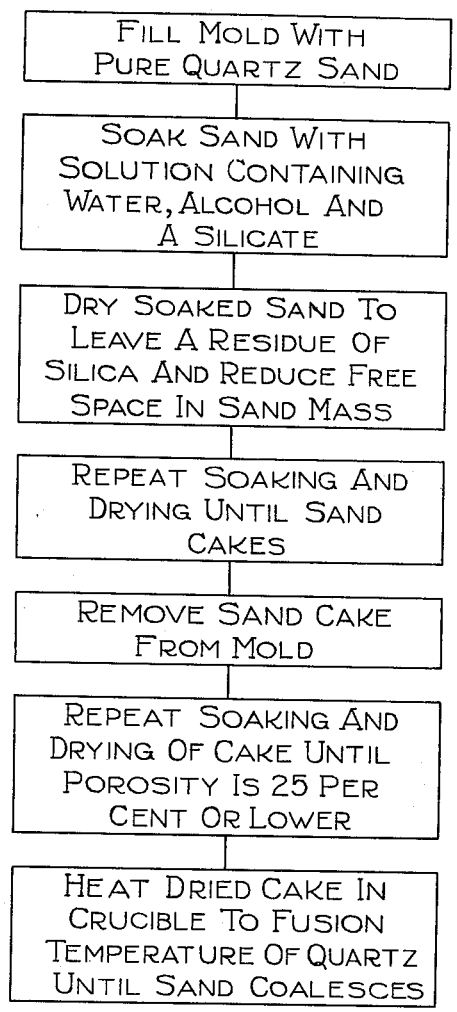

United States Patent Office 2,726,487
Patented Dec. 13, 1955

2,726,487
METHOD FOR MAKING FUSED VITREOUS QUARTZ

Robert K. Cummins, Euclid, and Robert J. Sommer, Cleveland Heights, Ohio, assignors to General Electric Company, a corporation of New York Application November 21, 1952, Serial No. 321,832

3 Claims. (Cl. 49—78.1)

The present invention relates to the production of clear, substantially pure and bubble free fused quartz.

Various methods have been proposed for the production of fused quartz bodies from quartz particles or crystals but as far as we are aware no one has succeeded in producing from pure quartz sand in a simple and inexpensive manner a clear fused quartz body substantially free from impurities and bubbles.

The principal object of the present invention is to provide a simple and effective method for producing such fused quartz bodies from pure quartz sand. Further objects and advantages of the invention will appear from the following detailed description thereof.

We have observed that when a mass of pure quartz sand is placed in the usual graphite crucible and heated to fusion temperatures under vacuum the result is a discolored, opaque fused quartz body filled with small cavities or bubbles which is useless for commercial use as an envelope material for quartz lamps, for example.

We have found that when a mass of finely divided quartz, such as a molded mass of pure quartz sand, is treated before fusion so as to reduce the free space in the mass, that is the space between the grains, the mass so treated may be fused under vacuum and in a graphite crucible to produce a clear, solid, homogeneous body of vitrified silica comparable to that now in commercial use for many products including the envelopes of high pressure mercury vapor discharge lamps.

We believe that reducing the free space between the grains of the mass of quartz sand placed in the graphite crucible is effective by causing the flow of carbonaceous gases resulting from the reaction between the silica and the graphite crucible during heating to be restricted to areas outside the fusion path in the mass. Thus, any reaction between these gases and silica in the body of the mass is effectively prevented and a substantially bubble free, clear quartz product results.

Whether or not our belief is in accordance with the true facts, we have demonstrated that when, in accordance with our invention, the free space in the mass of pure quartz sand to be fused is reduced by successive impregnations of the sand mass with a hydrolized solution of a silicate which upon drying of its liquid component deposits silica within the mass, a body of low porosity is obtained which can be fused in a vacuum in a graphite crucible to produce a clear, substantially pure and bubble free body of vitrified silica.

A material useful for impregnating the mass before fusion is a hydrolized ethyl orthosilicate solution containing alcohol as a solvent. Upon loss of alcohol and water, which may be driven off by heating the sand mass, the solution deposits silica which, with successive impregnations and dryings, gradually reduces the free space in the mass. We have found also that the addition of a mineral acid or alkaline materials in the solution is beneficial because it hastens the deposition of silica from the solution to speed up the process.

In the drawing accompanying and forming part of this specification:

Fig. 3 is a diagram of the several steps of the method of the invention.

Figure 1:
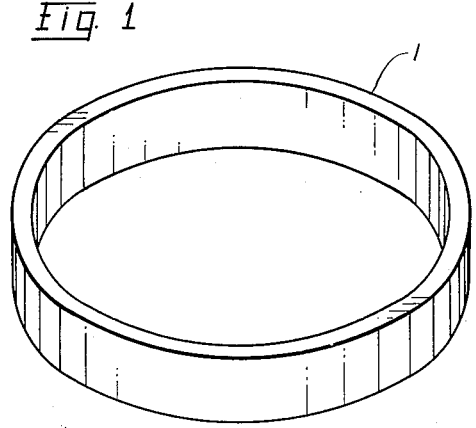
Fig. 1 is a perspective view as seen from above of a suitable ring mold for forming a flat cake of impregnated quartz sand in accordance with the new method.

Referring to the drawing the ring mold shown at 1 in Fig. 1 is made of a suitable material, such as graphite, which is resistant to attack by the hydrolized solution and any addition of mineral acid or alkaline material. The mold may be lined with a suitable material, such as aluminum foil, to allow ready separation of the molded sand cake from the mold. The foil may be dispensed with if a suitable closed bottom vessel is used as a mold or if desired it may also be used with such a vessel. A mold six inches in diameter and about two inches in height is suitable.

Figure 2:
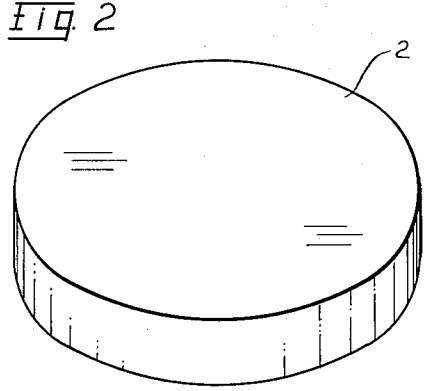
Fig. 2 is a similar view of the finished circular slab of vitreous quartz after fusion.

In making the slab 2 shown in Fig. 2 the method shown in the form of a flow sheet in Fig. 3 is effective. In the method the foil lined mold 1 is first filled completely with pure quartz sand. A solution containing a silicate is then poured into the mold until the contained sand is saturated throughout the mass by the solution. The filled mold 1 may be allowed to stand in air until the saturated mass is dried. The drying may be hastened by placing the filled mold in an oven and heating first to a temperature of about 55° C. to drive off the alcohol and thereafter to a temperature of about 1000° C. to drive off the water and leave a deposit of silica. An electric oven is suitable for this heating.

The heating accomplishes the step of evaporating the liquid component of the solution to dry the sand throughout the mass leaving a residue of silica in the interstices of the mass to reduce the free space between the sand grains.

This soaking and drying treatment is repeated until a cake of sufficient strength to withstand normal handling is formed and the cake is then removed from the mold. Usually two treatments are sufficient to cause the sand grains to cohere sufficiently for the removal of the cake from the mold.

After removal of the cake from the mold the steps of soaking the cake in a bath with the solution and then drying, are repeated for about 10 to 15 times until the porosity of the cake is substantially reduced.

The porosity of the cake is expressed hereinafter in percentages. The percent porosity is an estimate of the solidity of the cake as determined by comparison of actual density to maximum obtainable density for pure quartz which is 2.65. The percent porosity is obtained by dividing the difference between the two densities by 2.65 and multiplying this quotient by 100. A figure of about 25 percent porosity of the cake as so determined is suitable for the purposes of the invention and, of course, the lower the porosity the better the results will be.

After the desired low porosity is attained by repeated soaking and drying of the cake the dried cake is placed in a graphite crucible of circular shape and heated in a vacuum in an electric furnace to the fusion temperature of quartz to cause the material of the cake to coalesce throughout its mass.

On cooling of the crucible and its contained fused vitreous quartz the flat disc or slab 2 (Fig. 2) of clear transparent quartz substantially free from voids, gas bubbles and discoloring matter is removed from the crucible.

A suitable and preferred solution for use in the method is a hydrolized ethyl orthosilicate solution which is made by first preparing a partially hydrolized solution by mixing together 50 volumes ethyl silicate
30 volumes denatured ethyl alcohol
1 volume water The partially hydrolized solution is not totally hydrolized for at least 24 hours after mixing and preferably not until just before use in the method. The solution is totally hydrolized by mixing 1 volume of water with 9 volumes of the above partially hydrolized solution.

The addition of a mineral acid or alkaline material to the totally hydrolized solution facilitates carrying out the method by shortening the time required for deposition of the silica from the solution in the cake 1. Comparatively small amounts of the mineral acid or alkaline material are highly effective and the speed of deposition is controllable by the amount of this material used. In order to control the process, minute quantities of the mineral acid or alkaline material are preferred. For example, one percent by volume of 10 percent hydrochloric acid added to the totally hydrolized solution is highly effective though even a smaller amount of this acid gives satisfactory results.

It is, of course, advantageous to use a fine grain quartz sand so that the porosity of the sand mass before the soaking and drying treatment is low.

Other materials, such as sodium silicate, may be used for depositing silica in the mass, though of course the liquid vehicle used and the treatment to cause the silica to be deposited will vary with the nature of the material.

While we have described a specific mold for the quartz sand and a specific method for treating the molded mass of sand it is to be understood that we contemplate that the form and material of the mold may be changed and that various changes, omissions and substitutions may be made in the several steps of the process by those skilled in the art without departing from the spirit of our invention.

What we claim as new and desire to secure by Letters Patent of the United States is:

1. The method of making fused vitreous quartz which comprises the steps of molding a mass of pure quartz sand into a flat shape, reducing the porosity of said shaped mass and causing the sand grains in said mass to cohere to form a flat cake by successive treatments of said molded mass with a hydrolized ethyl orthosilicate solution containing about 1 percent by volume of 10 percent hydrochloric acid, each of said treatments consisting of soaking said mass with said solution and thereafter heating said mass in the mold to a temperature of about 55° C., to drive off the alcohol and then to a temperature of about 1000° C. to drive off the water, removing the cake from the mold when so formed, then continuing the said treatments of said mass to reduce its porosity to less than about 25 percent, and thereafter heating said cake in a graphite crucible in a vacuum to the fusion temperature of quartz for a time sufficient to cause coalescence of the quartz sand into a clear, homogeneous, substantially pure and bubble free vitreous quartz disc.

2. The method of making fused vitreous quartz which comprises the steps of molding a mass of pure quartz sand, reducing the porosity of the molded sand mass and causing the sand grains in said mass to cohere to form a cake by successive treatments of the molded mass with a hydrolized ethyl orthosilicate solution, each of said treatments consisting of soaking said mass with said solution and thereafter heating said mass in the mold to a temperature of about 55° C. to drive off the alcohol and then to a temperature of about 1000° C. to drive off the water, removing the cake from the mold when so formed, then continuing the said treatments of said mass to reduce its porosity to less than about 25%, and thereafter heating said cake in a graphite crucible in a vacuum to the fusion temperature of quartz for a time sufficient to cause coalescence of the quartz sand into a clear, homogeneous, substantially pure and bubble free vitreous quartz body.

3. The method of making fused vitreous quartz which comprises the steps of molding a mass of pure quartz sand, reducing the porosity of the said molded mass and causing the grains in said mass to cohere by successive treatments of said molded mass with a solution of a liquid vehicle and a silicate which upon drying deposits silica within the mass, each of said treatments consisting of soaking said mass with said solution and thereafter evaporating the liquid component of the solution to dry the quartz sand throughout the mass and leave a residue of silica in the interstices of the mass to reduce the free space between the sand grains, removing the coherent mass from the mold, then continuing the said treatments of said coherent mass to reduce its porosity to less than about 25%, and thereafter heating said coherent mass in a graphite crucible in a vacuum to the fusion temperature of quartz for a time sufficient to cause coalescence of the quartz into a clear, homogeneous, substantially pure and bubble free vitreous quartz body.

References Cited in the file of this patent

UNITED STATES PATENTS

| | | |
|---|---|---|
| 1,909,008 | Prange | May 16, 1933 |
| 2,027,931 | Ray | Jan. 14, 1936 |
| 2,154,079 | Weiss | Apr. 11, 1939 |

FOREIGN PATENTS

| | | |
|---|---|---|
| 965,864 | France | Feb. 22, 1950 |